United States Patent [19]

Palmer et al.

[11] 3,913,073

[45] Oct. 14, 1975

[54] MULTI-MEMORY COMPUTER SYSTEM

[75] Inventors: Leonard Palmer, Concord, Calif.; Michael M. Tyler, Bellville, Mich.

[73] Assignee: Burroughs Corporation, Detroit, Mich.

[22] Filed: May 31, 1973

[21] Appl. No.: 365,748

[52] U.S. Cl. .......... 340/172.5
[51] Int. Cl.² .......... G06F 9/18
[58] Field of Search .......... 340/172.5

[56] References Cited

UNITED STATES PATENTS 3,373,408 3/1968 Ling .......... 340/172.5

*Primary Examiner*—Leo H. Boudreau
*Attorney, Agent, or Firm*—Arthur Decker; Nathan Cass; Keven R. Peterson

[57] ABSTRACT

A digital computer memory system auxiliary to the main memory but of the same type, which the processor operates, in a prior mode, to load the auxiliary memory with the master control program and, in a subsequent mode, to utilize as a non-destructive read-only memory in accessing the master control program as required, thereby making the master control program available to the processor with the same immediacy as it would have been available from the main memory and relieving the main memory of the burden of storing the master control program.

8 Claims, 2 Drawing Figures

MULTI-MEMORY COMPUTER SYSTEM

BACKGROUND OF THE INVENTION

Computer technology has advanced to a current stage characterized by systems in which each of their building blocks (e.g., the memory, the processor and interfaces to peripherals) are not only represented by a variety of different types, but also in the plurality and with a wide selection of admixtures. Thus, in the same system, one or more processors may coordinate through interfaces with a number of memories some relatively slow, such as magnetic and paper tape units and disk and drum files, and some relatively fast, such as magnetic core stacks and integrated circuit panels, and access to a storage area in the "fast" group may be commensurate in speed with access to a storage area in the "main" memory integral with the processor.

Thus, for the sake of simplicity, consider a system in which a processor which includes a fast-access core stack main memory of limited storage capacity, is connected (through respective interfaces) with slow-access disk files of extensive storage capacity, a system which is considered appropriate for a wide range of applications, mainly because of the hardware simplicity of the processor. Generally supplied with the system is a master control program (MCP) which controls operations common to most user programs; customarily, the MCP is stored in a disk file. Normally, a small portion of the MCP is transferred to the core stack because this portion will handle a large percentage of recurrent operations, and other portions of the MCP are accessed from the disk file as required to handle less recurrent operations. The core stack also stores user programs and data. In other words, information is allocated between the memories with a view toward minimizing the time for its obtenation and the time for computation.

In extending the application scope of this system, additional disc files may be connected, but if careful thought is given to data throughput, a point may be recognized at which the core stack capacity is insufficient to provide system efficiency; repetitious transfers between core stack and disk files and additional programming to keep track thereof are found too time consuming. At this point, it probably would be preferable to add to the main memory core stack and endure the additional hardware complexity.

BRIEF SUMMARY OF THE INVENTION

The present invention provides a different approach to the aforementioned problem. As represented by its preferred embodiment, the invention adds to the system (through an interface) additional memory, but of the same type (i.e., equally fast in access) as the main memory, and provides system sequencing which loads this auxiliary memory on start-up with the MCP. The invention subsequently operates the auxiliary memory in read-only fashion to control thereby availability to the processor of the MCP as though it were stored in its entirety in the main memory. Furthermore, since operation on the MCP may be considered manipulative rather than executive, it is designated part of the system control mode during which interrupt conditions are processed, input-output operations are initiated, file and memory allocation is made, jobs scheduled, etc.; accordingly, the system indicators which distinguish control mode from execute mode, i.e., the program control elements and timing units, are used to resolve the address ambiguity between main memory and auxiliary memory which necessarily results when it is desired not to add to the number of addressing elements. By this means, to a great extent, the invention reduces the wasteful expenditure of program effort, memory capacity and running time with which computers try to overcome the limitations of their integral organization.

DESCRIPTION OF THE PREFERRED EMBODIMENT

Figure 1:
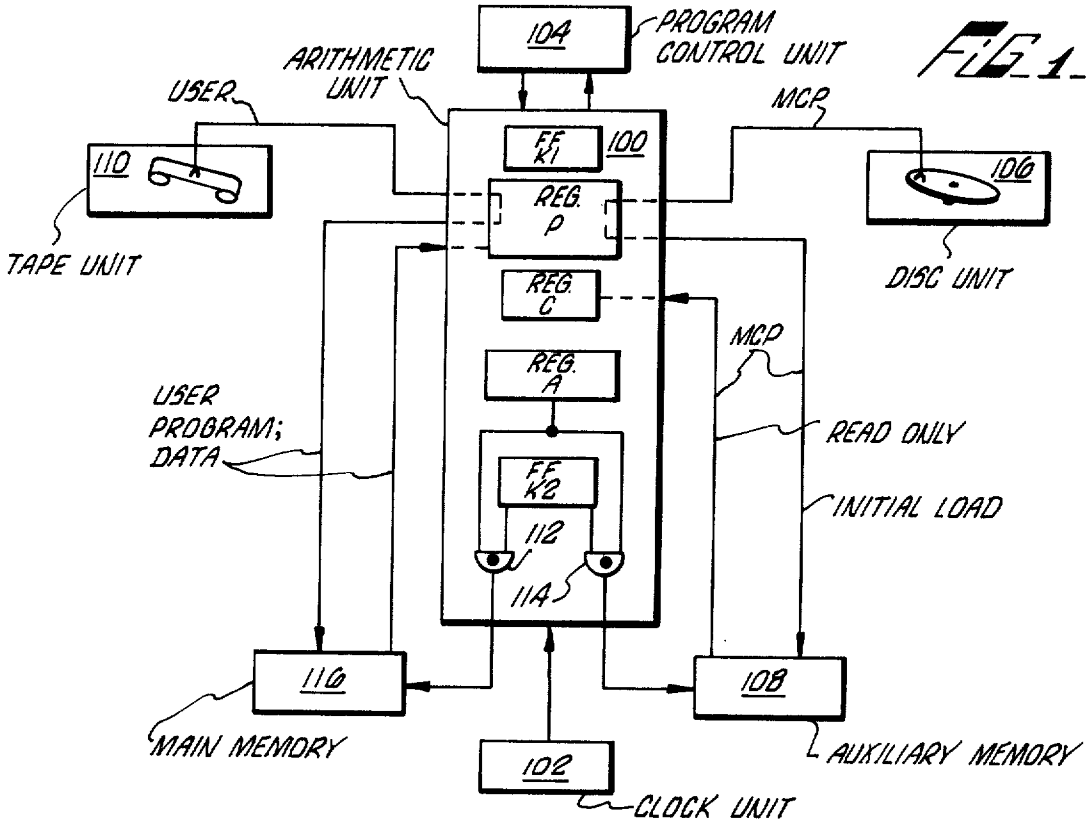
FIG. 1 is a block diagram of a computer system which may embody the present invention.

Before embarking on a detailed description of the preferred embodiment of the invention shown in the drawings, it may be appropriate to provide some brief comments on the general purpose computer and how it is used.

A general purpose computer carries out a function by performing numerical methematical operations according to a series of commands (the program) which, during their execution, the computer may modify either in a preset manner or according to the outcome of tests on intermediate results of computation. Its operations are consequently definable as arithmetic, input-output and sequencing and its equipment correspondingly comprises units which contribute logic, peripheral interface and control.

A proper description of this invention requires that a clear distinction be made between arithmetic, input-output and control operations, and that it should be recognized when the respective units are to be active, since the information which the units will manipulate is different and is stored in different memories (i.e., as has already been intimated, the auxiliary memory stores the MCP whereas other information may be allocated between both main and auxiliary memories). This distinction will be made by referring to the computer system's program control unit and, if necessary, its timing (i.e., "clock") unit, the former of which sequences the computer operations and the latter of which designates the computer word, digit and bit periods.

Referring now to FIG. 1, here is shown a very generic block diagram of a preferred form of computer system for embodying the present invention. This system is of the general purpose type capable of storing numbers as combinations of bilevel states in sets of memory elements, and involves the sequential operation of circuits, including pulse sources, gates, etc. to trigger the memory elements in accordance with Boolean equations which represent the computer activity leading to the accomplishment of the desired objectives.

Arithmetic unit (AU) 100 is comprised mainly of networks which function to interconnect the registers counters, input-output equipment, etc., of the system so as to route information in accordance with the commands selected by the program from the set which the computer is capable of executing. Accordingly, AU 100 is shown connected by lines to some units while embodying others, although it should be understood that a showing of connection or embodiment is a choice directed mainly toward teaching the invention and not actual structural configuration.

The computer processes are divided into sequential operations each requiring a work period for its execution. It is the function of clock unit (CU) 102 to delineate the word periods as well as the digit and bit periods into which they are divided. As an example, CU 102 may consist of a pair of counters, one having a 16-count output each count corresponding to a decimal digit, and the other having a 4-count output each count corresonding to a bit. Thus, by referring to the outputs of both counters, each of the 64 bit periods in a word is identified for AU 100. It is recognized, of course, that some computer organizations are based on variable word periods with the intent to effectuate savings in throughput; as this description proceeds, it will be apparent to those skilled in the art that such designs in no way preclude the incorporation of the invention.

Program control unit (PCU) 104 usually also takes the form of a counter the outputs of which are accepted by AU 100 to render certain networks active during each word period so as to accommodate each of the operations. The content of PCU 104 is subject to being changed precisely at the end of each word period, as directed by the state of flip-flop K1 during the last bit period of each word period, to cause the same or other networks to become operable during the next word period. Further, since flip-flop K1 is connected to be triggered in accordance with the manipulation in progress during the word period (i.e., flip-flop K1 "follows" the operation), it is apparent that the results of the operation underway provide the foundation for operations to be undertaken. Thus, the computer sequences in orderly fashion to accomplish its program.

From the foregoing, computer operating modes may be defined broadly as: a control mode, comprising those periods in which PCU 104 is causing AU 100 to fetch MCP from auxiliary memory (AM) 108 and an execute mode, comprising those periods in which PCU 104 is causing AU 100 to fetch information from main memory (MM) 116 and/or operations such as computation, comparisons, shifts or other arithmetic are going on. These two modes are distinguishable, from a hardware standpoint, by the states of PCU 104, CU 102 and flip-flop K1 (or their equivalents), in various combinations in various computers.

It has already been mentioned that the invention contemplates operation in which the MCP is initially loaded from an external store to an auxiliary memory and subsequently referred to as required in read only fashion, and that user programs and their data are initially loaded from an external store to the main memory. Accordingly, it is presumed that the MCP has been priorly recorded into disk unit (DU) 106, and that the user programs and their data have been priorly recorded into tape unit (TU) 110. DU 106 and TU 110 are accessed by AU 100 so that these transfers may be made. These operations are generally done through fill register P which accepts and delivers this information. The addresses in AM 108 and MM 116 for storage are designated by the programmer and set up in memory access register A through the system control console (not shown). The output of register A is gated via gates 112, 114 under control of flip-flop K2, to either AM 108 or MM 116. Thus, flip-flop K2 permits AU 100 access to AM 108 or MM 116, the address as specified by register A.

In a general way, register P functions as the computer input-output buffer, its function at any specified time being specified by AU 100 logic called for by PCU 104. Thus, in accordance with the foregoing description, register P is shown as the interface for DU 106 and AM 108 for initial load of the MCP and similarly for TU 110 and MM 116 for initial load of user programs and data therefor, and, further, during the system execute mode of operation, acts as receiver for AU 100 of MM 116 information.

In like fashion, during the system control mode of operation, register C acts as receiver for AU 100 of AM 108 information; this information, as already mentioned, comprises the MCP.

A brief survey of computer system operation under the general diagram in FIG. 1 may be appropriate. For this purpose, it will be presumed that the MCP which, it will be recalled, governs the system activity, is stored in DU 106, several user programs and their data are stored in TU 110 and the computer is idling (in control mode). The operator sets in motion a special fill routine which reads the MCP out of DU 106 through register P and into AM 108 addresses he has chosen and which are accessed sequentially by register A via gate 114. On completion of the MCP fill, the computer returns to its idle condition. The operator then enters the address of the first command of the MCP into register P and pushes the console start button. The address is transferred to register A and, since the system is still is control mode, gate 114 opens and AM 108 is accessed; the first MCP command is accordingly transferred to register C. Presuming that the command instruction (i.e., order code) directs input from TU 110, AU 100 will set TU 110 in motion, energize gate 112 instead of gate 114 i.e., trigger flip-flop K2 (execute mode), transfer readout addresses specified by register C to register A and route the information coming from TU 110 through register P and into locations of MM 116. When the user programs and data are transferred, TU 110 will so signal (usually by a code in the last word transferred) and AU 100, in response thereto, will retrigger flip-flop K2 (control mode) and the system will return to its idle state.

Figure 2:
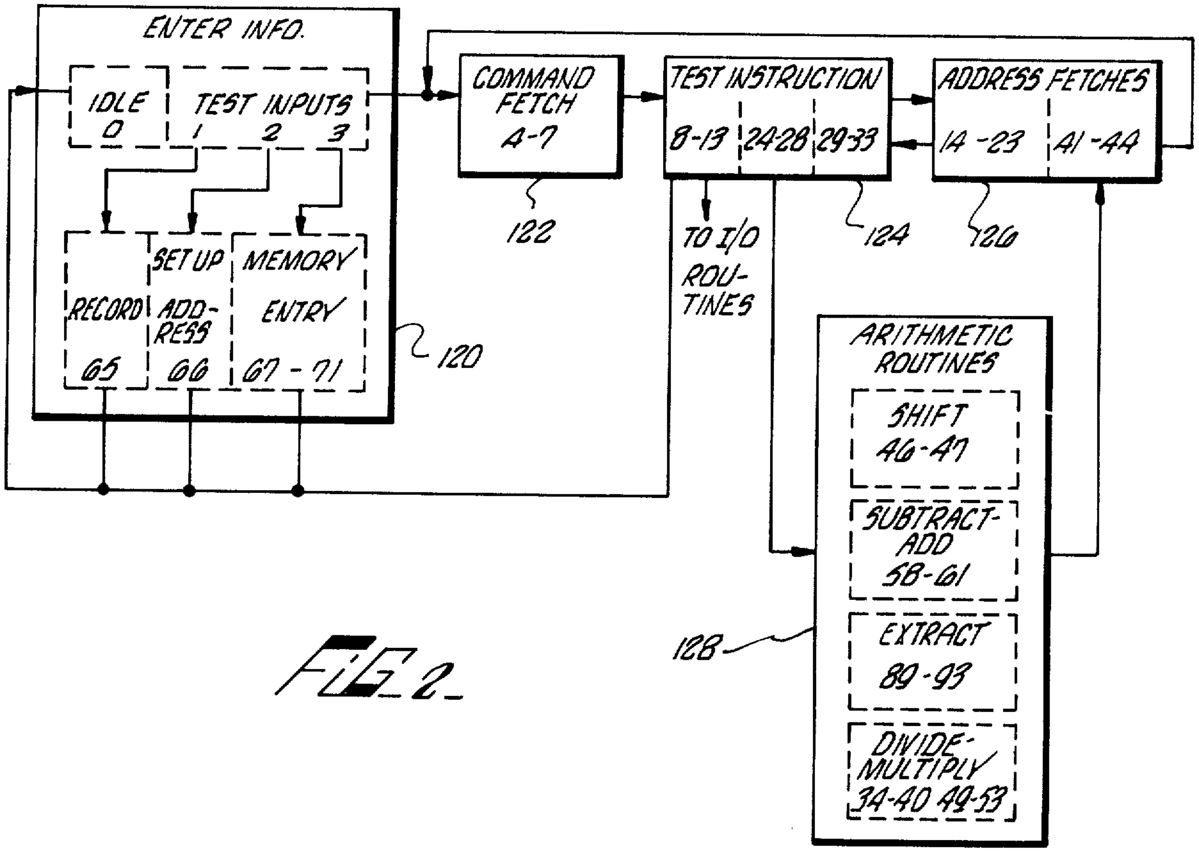
FIG. 2 is a generic showing of a flow diagram in accordance with which the computer system of FIG. 1 may operate.

Further details of the above equation will now be provided by reference to FIG. 2, an extract from the flow diagram of a general purpose digital computer described completely in U.S. Pat. No. 2,954,166 to Eckdahl et al.

The organization of the computer corresponds to the programming technique which involves, in essence, the scheduling of the presentation of information signals to AU 100 on a time division basis controlled by PCU 104. Each step of the process represents a time interval, (word period), equal to that for any other step, and is assigned a program count number (PC No.). As shown in FIG. 2, an operation is performed by executing these steps in a predetermined sequence, said sequence including the repetition of steps or a subsequent of steps if required. PCU 104 may change its state in one of two ways as determined by the outcome of an operation: it may count progressively or it may skip to a state outside its counting sequence. In either case, since commands are usually stored in memory in consecutively numbered addresses, AU 100 will refer to these addresses consecutively in controlling the computer to execute a program. However, it is often desirable for some applications to deviate from the orderly sequence ("interrupt" or "jump"), execute a command sequence stored elsewhere and subsequently, return to the original sequence at the interrupt to complete the computation. In brief, a command sequence may originate as a user program or MCP and consequently be called forth from MM 116 (execute mode) or AM 108 (control mode), respectively, but, on interrupt, the next command is part of MCP and is accessed from AM 108 (control mode). How these situations are handled by the invention will become apparent as FIG. 2 is discussed.

It is recognized that FIG. 2 provides a broader disclosure of the flow diagram of the computer described in the aforementioned patent. It is submitted that this showing is justified in view of the fact that the patent embodies detail down to the circuit level and its teachings, when absorbed by one skilled in the computer art, will enable him to incorporate the invention without undue difficulty. In fact, all that should be required is an identification of the modes (control and/or execute) which may characterize some of the basic operations indicated for representative sets of steps of the flow diagram of FIG. 27 and 66 of the patent. Of course, there must be observance of the differences in hardware designation from FIG. 1 herein, for example, as has been pointed out, register P is the computer input register, register C is the control number register, flip-flops K1 and K2 are the sequence control for PCU 104, etc.

With regard to the last mentioned, the use of two memory elements, flip-flops K1 and K2 for sequence control, seems deserving of some special attention. Flip-flop K1 functions in several ways: it follows the word period operation and is regarded at every last bit period by AU 100 as a basis for establishing the next state in PCU 104, it serves as a carry store in certain arithmetic operations and as a continuous comparison indicator, etc. Consequently, it is common for flip-flop K1 to undergo many changes of state during a word period. Since, as a general rule, memory access (selection between AM 106 and MM 116) must remain constant during most if not all of those word periods calling for access, gates 112 and 114 must remain correspondingly active. Accordingly, an intermediate element, here flip-flop K2, is used to store the decision state of flip-flop K1 for as long as required to provide the memory access. The activity of these flip-flops may be summarized in the following table.

| K1 | K2 | PCU 104 | memory access |
|---|---|---|---|
| 0 | 0 | count | AM 108 |
| 0 | 1 | count | MM 116 |
| 1 | 0 | skip | AM 108 |
| 1 | 1 | skip | MM 116 |

It is in accordance with the above table, then, that confusion of access to the two memories with the same address set up in register A is avoided; simply stated, flip-flop K2 acts as an extension (memory selector) to the address specified by register A.

The program blocks of FIG. 2 may now be characterized as control and/or execute modes.

| block | PC No. | mode | |
|---|---|---|---|
| 120 | 0–3 | control | MCP entry |
| | 65–71 | execute | user program or data fill |
| 122 | 4–7 | control or execute | command fetch |
| 124 | 8–13, 24–28 | control or execute | test the command instruction to identify next flow branch |
| 124 | 29–33 | execute | control number storage and test for multiplication |
| 126 | 14–23 | control or execute | address fetch and test for overflow |
| | 41–44 | execute | address fetch |
| 128 | 34–40, 46–47, 49–53, 58–61 | execute | arithmetic routines |
| | 89–93 | control | input-output routines |

It is again remarked that the invention has been described with regard to a computer system which, although well known, nevertheless is of specific configuration. Since the invention may quite easily be adapted to other configurations without a substantial change in essence, it follows that such adaptations are contemplated as within its scope. For instance, one important objective which directed the configuration of the memory system for the preferred embodiment described herein was reduction of information access time; it should be apparent that other considerations may direct that memories 108, 116 (FIG. 1) not be of the same type and/or speed of access, although a compatible addressing technique is very desirable. Furthermore, it will readily be recognized that this specification implies no structural limitation to those acquainted with computer or logic design; for instance, although the decision and memory elements selected for representation comprise the "AND - inclusive OR - NOT" combination and the R-S flip-flop, respectively, any of the elements specified on pages 53 through 56 and 121 through 132 of the book "Logical Design of Digital Computers" by M. Phister, Jr., Wiley and Sons, Inc. N.Y., 1958, may be selected. In brief, the present description should be considered exemplary for teaching those skilled in the computer arts and not constrained to the showings herein or in the incorporated reference.

What is claimed is:

1. In a stored program computer system including an arithmetic unit including a number of arithmetic networks for operating in an execute mode or a control mode:

a counter unit for delineating word periods;

a control flip-flop for assuming various states during each word period;

a program counter unit for holding a count to activate various arithmetic networks during each word period; said count being determined by the state of said control flip-flop at the end of each prior word period;

an auxiliary memory for storing a master control program;

a main memory for storing a user program and data;

means for producing a control mode signal and an execute mode signal for the state of said program counter unit and control flip-flop, said control mode signal indicating that said master control program is to be accessed and said execute mode signal indicating that said main memory is to be accessed;

means for storing said signals and maintaining said signals despite changes in state of said control flip-flop; and gate means for effecting transfer of instructions of said master control program to said arithmetic unit in response to said first signal and for effecting transfer of information from said main memory to said arithmetic unit in response to said second signal.

2. The system of claim 1; and means to fill said memories with information corresponding to their storage functions.

3. The system of claim 2 in which said fill means comprise disk and tape storage units.

4. The system of claim 2 in which, after load by said fill means, said auxiliary memory is operated in read-only fashion.

5. The system of claim 2 including a register for coordinating the operation of said memories with said respective fill means.

6. The system of claim 5 including a register for receiving information accessed from said auxiliary memory.

7. The system of claim 1 including an address register for storing an address capable of being accessed in either of said memories; and means controlled by said storage means and said register and capable of selective activation of said memories.

8. The system of claim 7 including a second register for buffering information to said memories and from one of said memories; and a third register for buffering information from the other of said memories.

* * * * *

UNITED STATES PATENT AND TRADEMARK OFFICE

CERTIFICATE OF CORRECTION

PATENT NO. : 3,913,073

DATED : October 14, 1975

INVENTOR(S) : Leonard A. Palmer; Michael M. Tyler

It is certified that error appears in the above-identified patent and that said Letters Patent are hereby corrected as shown below:

Col. 2. line 8, change "integral" to --internal--.

Col. 3, line 4, change "work" to --word--.
Col. 4, line 29, change "is", second occurrence, to --in--.
line 44, change "equation" to --operation--.
line 59, change "quent" to --quence--.
Col. 6, line 66, change "for" to --from--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*